United States Patent
Woeste et al.

[11] Patent Number: 6,125,714
[45] Date of Patent: Oct. 3, 2000

[54] SELECTING DEVICE FOR AN AUTOMATIC TRANSMISSION OF A MOTOR VEHICLE

[75] Inventors: Norbert Woeste, Munich; Josef Neuner, Raubling, both of Germany

[73] Assignee: Bayerische Motoren Werke Aktiengesellschaft, Munich, Germany

[21] Appl. No.: 08/916,236

[22] Filed: Aug. 22, 1997

[30] Foreign Application Priority Data

Aug. 22, 1996 [DE] Germany .................. 196 33 948

[51] Int. Cl.⁷ .................................. F16H 59/10
[52] U.S. Cl. ...................... 74/473.18; 74/471 XY
[58] Field of Search ................. 74/473.18, 335, 74/141.5, 471 XY

[56] References Cited

U.S. PATENT DOCUMENTS

| | | | |
|---|---|---|---|
| 3,292,450 | 12/1966 | Hurst et al. | 74/473.18 |
| 4,987,792 | 1/1991 | Mueler et al. | 74/335 |
| 5,044,220 | 9/1991 | Raff et al. | 74/473.18 |
| 5,062,314 | 11/1991 | Maier et al. | 74/473.18 |
| 5,070,740 | 12/1991 | Giek et al. | 74/473.18 |
| 5,622,079 | 4/1997 | Woeste et al. | 74/473.18 |
| 5,689,996 | 11/1997 | Ersoy | 74/473.18 |

FOREIGN PATENT DOCUMENTS

| | | |
|---|---|---|
| 3927248C1 | 2/1991 | Germany . |
| 3717675C2 | 9/1994 | Germany . |
| 4426207 | 8/1995 | Germany . |
| 19600526A1 | 6/1996 | Germany . |

Primary Examiner—David A. Bucci
Assistant Examiner—William C Joyce
Attorney, Agent, or Firm—Evenson, McKeown, Edwards & Lenahan, P.L.L.C.

[57] ABSTRACT

A selecting device for an automatic transmission of a motor vehicle is suggested in the case of which the selector lever can be swivelled back and forth between two different shifting channels. One shifting channel for the step shifting permits a manual shifting of the automatic transmission; the other shifting channel for engaging the individual driving positions permits the automatic operation of the transmission. The selecting device is designed such that it requires little space and is constructed in a simple manner of few component parts.

29 Claims, 4 Drawing Sheets

SELECTING DEVICE FOR AN AUTOMATIC TRANSMISSION OF A MOTOR VEHICLE

BACKGROUND AND SUMMARY OF THE INVENTION

This application claims the priority of German application 196 33 948.0 filed in Germany on Aug. 22, 1996, the disclosure of which is expressly incorporated by reference herein.

The invention relates to a selecting device for an automatic transmission of a motor vehicle of the type having a shifting channel for preselecting the individual driving positions in the automatic operation by way of a mechanical connection between the selecting device and at least one hydraulic transmission control device and having a shifting channel for the step-by-step shifting of the gears in the manual operation.

It is known to design an automatic transmission and its selecting device such that it is possible for the driver to decide by means of the selecting device whether he wants to use a step shifting operation or an automatic driving position system.

In the case of the automatic driving position system, the operating range of the automatic transmission is divided into different manually preselectable operating positions which are called driving positions. The term "driving positions" as used here comprises all operating positions of an automatic transmission, thus also the parking or neutral position. The driving positions are engaged by operating the selecting device which, by way of a mechanical connection, controls a hydraulic transmission control and parking device.

In the step shifting operation, the automatic transmission is shifted manually by the driver. By swivelling the selector lever from a center position he can shift one gear up or back depending on the direction into which he moves the selector lever. After each shifting operation, the selector lever returns to its center position.

Such a selecting device is described in German Patent Document DE 44 26 207 C1.

Since the mounting space for the selecting device in the motor vehicle is limited, the selecting device should be as compact and small as possible.

It is therefore an object of the invention to design a selecting device for an automatic transmission of a motor vehicle such that it is constructed of as few parts as possible in a compact and small manner.

According to the invention, the object is achieved by providing an arrangement having a selector lever which is pivotably supported in a longitudinal and transverse direction of the vehicle by way of a first and a second axle disposed in a vehicle-fixed frame and which, by about the first axle, can be moved in the longitudinal direction of the vehicle in one of the shifting channels respectively which extend in parallel and, by the swivelling about the second axle, can be shifted back and forth between these shifting channels in the transverse direction of the vehicle, wherein the mechanical connection is a tension/pressure connection which transmits longitudinal movements and which, in the automatic operation, is linked directly to the selector lever.

According to the invention, the mechanical connection between the selecting device and at least the hydraulic transmission control device is a tension/pressure connection which transmits longitudinal movements and which, in the case of an automatic operation in the driving position selection channel, is linked directly to the selector lever.

This has the advantage that the operating lever is eliminated to which, according to the state of the art, the tension/pressure connection is mounted which is constructed as a selecting cable. Also, because of the elimination of the operating lever, the additional components of the selecting device can be arranged in an even more space-saving and compact manner. Furthermore, they can be designed and arranged even more easily for carrying out several functions.

A preferred embodiment of the invention provides that, during the step-by-step shifting of the gears in the manual operation in the step shifting channel, the tension/pressure connection is uncoupled from the selector lever. This provides a particularly simple possibility of mutually uncoupling the step shifting system and the driving position selecting device.

Additional advantageous embodiments of the invention optimize it in addition with respect to the space requirement and the number of components. Also, an even simpler construction is achieved which lowers the manufacturing and mounting costs of the selecting device and ensures its reliable operation.

If the selecting device is constructed such that the selector lever is disposed by way of the first axle on the shifting gate which is mounted by way of the second axle on the frame, during the pivoting of the selector lever from one shifting channel into the other, this shifting gate can be pivoted along with the selector lever. The detent devices for fixing the shifting channels can simply be constructed on the shifting gate and the frame fixed to the vehicle. On this frame, the stop face will then be constructed which limits the longitudinal movement of the selector lever at the point at which its transverse movement between the shifting channels can be carried out. Between the selector lever and the shifting gate and the tension/pressure connection, particularly a holding extension on the selector-lever-side end of the tension/pressure connection, various effective surfaces are advantageously arranged in a simple manner which form-lockingly engage in one another for the operation of the step shifting system or of the driving position selecting device. All locking and operating functions for the selector lever are controlled by effective surfaces on the selector lever, the frame, the shifting gate and the tension/pressure connection, which permits a very simple construction of the selecting device.

Other objects, advantages and novel features of the present invention will become apparent from the following detailed description of the invention when considered in conjunction with the accompanying drawings.

DETAILED DESCRIPTION OF THE DRAWINGS

Figures 1, 1A:
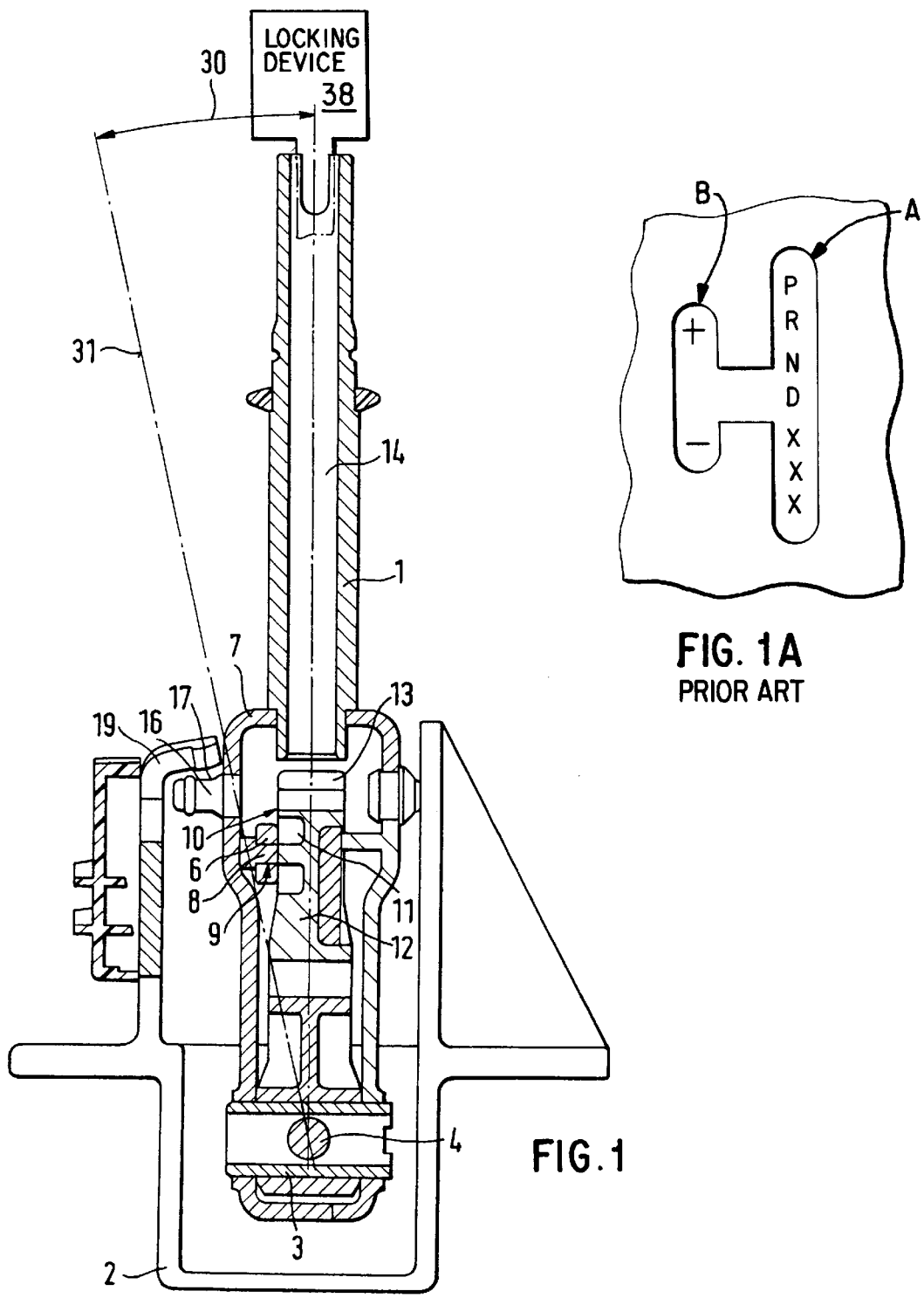
FIG. 1 is a cross-sectional view of a selecting device having a selector lever in the shifting channel of the automatic driving position system which can be swivelled in two shifting channels, constructed according to a preferred embodiment of the present invention.
FIG. 1A is a top view of the two shifting channels.

According to FIG. 1, the selector lever 1 of a selecting device for an automatic transmission of a motor vehicle which is not shown is swivellable in two directions which are set perpendicularly with respect to one another disposed in a vehicle-fixed frame 2 by way of a first axle 3 and a second axle 4. The first axle 3 extends in the transverse direction of the vehicle and permits a movement of the selector lever 1 in the longitudinal direction of the vehicle for preselecting the individual driving positions or shifting the gears in the step shifting system. The second axle 4 extends in the longitudinal direction of the vehicle and therefore forms the pivot axis of the selector lever 1 about which this selector lever 1 can be pivoted in the transverse direction of the vehicle from a shifting channel for preselecting the driving positions into a shifting channel for the step shifting. The pivot angle 30 of the selector lever 1 is indicated by the added center line 31 of its position pivoted into the step shifting channel. FIG. 1A shows two shifting channels. In FIG. 1, the selector lever 1 is situated in the shifting channel for preselecting the driving positions. In this shifting channel, by means of the swivel movement of the selector lever 1 about the first axle 3, successively at least the individual driving positions P, R, N and D can be engaged. The respective engaged driving position is sensed by way of the position of the selector lever by electric contacts 37 of a sensor device on a shifting gate 12 illustrated in FIG. 4.

By way of a mechanical tension/pressure connection with a holding extension 6 on its selector-lever-side end, the movement of the selector lever 1 in the driving position selection channel is transmitted to the automatic transmission. For this purpose, the selector lever 1 is form-lockingly connected with the holding extension 6. This connection is established by its swivelling from the step shifting channel into the driving position selection channel. In this case, a leg 7 pivots by means of a second effective surface 8 constructed on it as a circumferential surface of a pin into a third effective surface 9 of the holding extension 6 constructed as an internal bore surface. When the selector lever 1 is pivoted about the first axle 3 in the driving position selection channel, the holding extension 6 and therefore the tension/pressure connection transmitting the longitudinal movement moves along with it for controlling the automatic transmission by way of the hydraulic transmission control device.

In this case, the holding extension 6 is held in the transverse direction in the selector lever 1 on the pin by means of the shifting gate 12. For this purpose, the holding projection 6 rests by means of seventh effective surfaces on the shifting gate 12 in a sliding manner laterally on fifth effective surfaces which maintains a second form-locking connection between the selector lever 1 and the holding extension 6.

Furthermore, the shifting gate 12 has a groove-shaped recess 11 into which the additional axial course of the holding extension 6 projects. The groove-shaped recess 11 is so deep that the holding extension 6 can be received by it when the selector lever 1 is pivoted back from the driving position selection channel into the step shifting channel. In this case, the first axle 3 and the selector lever 1 as well as the shifting gate 12 embraced by the lower portion of the selector lever 1 are rotated about the swivel angle 30. The axis of rotation is the second axle 4 in the shifting gate 12. The first axle 3 is disposed in the shifting gate 12 and swivels along.

In addition, the shifting gate 12, which extends from its bearing point in the frame 2 upwards, has detent noses 13 on its upper surface which interact with a locking device and which is constructed on the selector lever 1. The locking device 38 extends through a bore 14 of the selector lever 1 and can be operated, for example, by means of a press key on the selector lever grip which is not shown.

For its shifting functions in the step shifting channel, the selector lever 1 has a pin 16 with first effective surfaces 17 on the leg 7 of its lower section, which first effective surfaces 17 engage by means of the pivoting of the selector lever 1 in a form-locking manner in corresponding effective surfaces 18 (FIG. 2) of a step shifting device 19. Pivoted into the step shifting channel, the selector lever 1 can be moved in parallel to the driving position selection channel about its first axle 3 in the longitudinal direction of the vehicle from its center position toward the front and rear. The pivoted movement takes place against the force of a spring which is not shown and which is housed in the step shifting device 19. This spring always returns the selector lever 1 into the center position.

The sensor device with the electric contacts 37 (FIG. 4) on the shifting gate 12 also determines the movements of the selector lever 1 in the step shifting channel and transmits the shifting signals to a transmission control unit which is not shown and which processes them. When the selector lever 1 is moved in the driving direction, the next higher gear is engaged; when the selector lever 1 is moved against the driving direction, the next lower gear is engaged.

Figure 2:
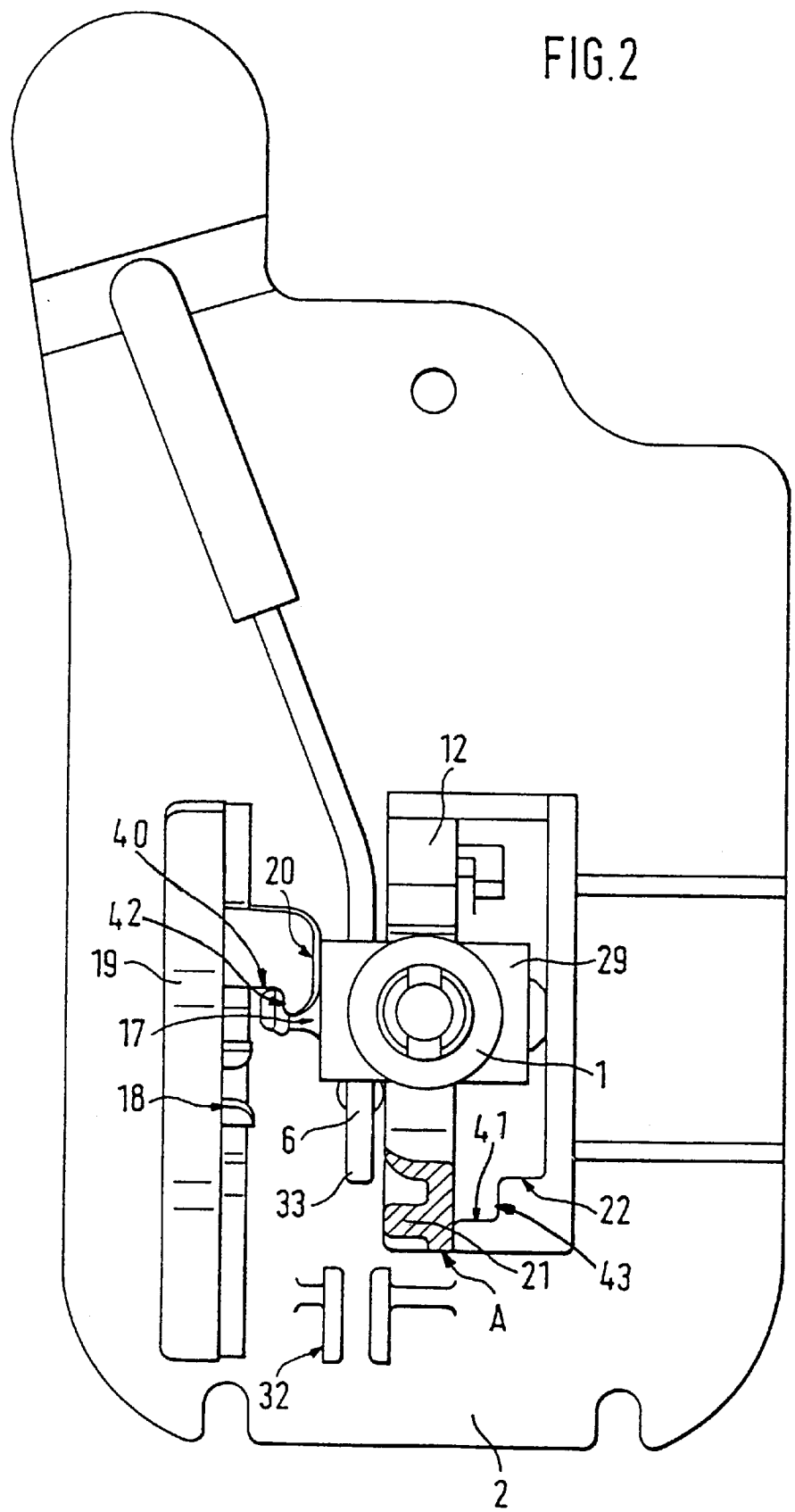
FIG. 2 is a partially sectional top view of the selecting device of FIG. 1.

As illustrated in FIG. 2, the selector lever 1, which is situated in the driving position selection channel, can be pivoted in only one position in this channel into the step shifting channel, specifically when it is ensured that its first effective surfaces 17 can engage with the corresponding effective surfaces 18 of the step shifting device 19. Since, in the inoperative position, the step shifting device 19 is always in the same center position, the selector lever 1 in the driving position selection channel, before being pivoted into the step shifting channel, must be brought into the corresponding position for this purpose. If it is not in this position, it is prevented that the selector lever 1 can be pivoted into the step shifting channel. This is achieved by means of a fourth effective surface 20 on the step shifting device 19 which, when the selector lever 1 is pivoted swivelled into the wrong position into the step shifting channel, comes to rest against its leg 7.

When the selector lever 1 is in the step shifting channel, its longitudinal movement toward the front is limited by a first additional frame-fixed stop face 40 which as an end stop on one side of the selector lever 1 comes in contact with the latter. The longitudinal movement of the selector lever 1 toward the rear is limited by a second additional frame-fixed stop face 41 as the end stop on the other side of the selector lever 1. Also, the additional frame-fixed stop faces 40, 41 are adjoined by additional frame-fixed effective surfaces 42, 43 which prevent a transverse movement of the selector lever 1 when this lever 1 is not in the position in which a shifting back into the driving position selection channel is possible. The second additional frame-fixed stop face 41 and the additional frame-fixed effective surface 43 are constructed directly on the frame 2.

Another pin 21 on the shifting gate 12 which extends in the transverse direction of the vehicle blocks by means of sixth effective surfaces on its circumference the holding extension 8 in the longitudinal direction of the vehicle when the selector lever 1 is in the step shifting channel and the second form-locking connection is therefore disengaged. For this purpose, the holding extension 6 reaches around the pin 21 of the shifting gate 12 in a third form-locking connection.

In this position, the holding extension 6 is also fixed in the transverse direction of the vehicle by means of a fourth form-locking connection. A fork 32, which is fixed to the frame 32, reaches around an extension 33 of the holding extension 6.

In order to more easily find the position of the selector lever 1 from which a pivoting into the step shifting channel is possible, the frame 2 has a stop face 22 which limits the longitudinal movement of the selector lever 1 in the driving position preselection channel by an interaction with another leg 29 of the selector lever 1 at the point at which the back and forth shifting between the shifting channels is possible.

At a point which in FIG. 2 is marked by an arrow with the reference symbol A, a detent device between the shifting gate 12 and the frame 2 is situated which is hidden in this view and which determines the positions of the two shifting channels.

Figure 3:
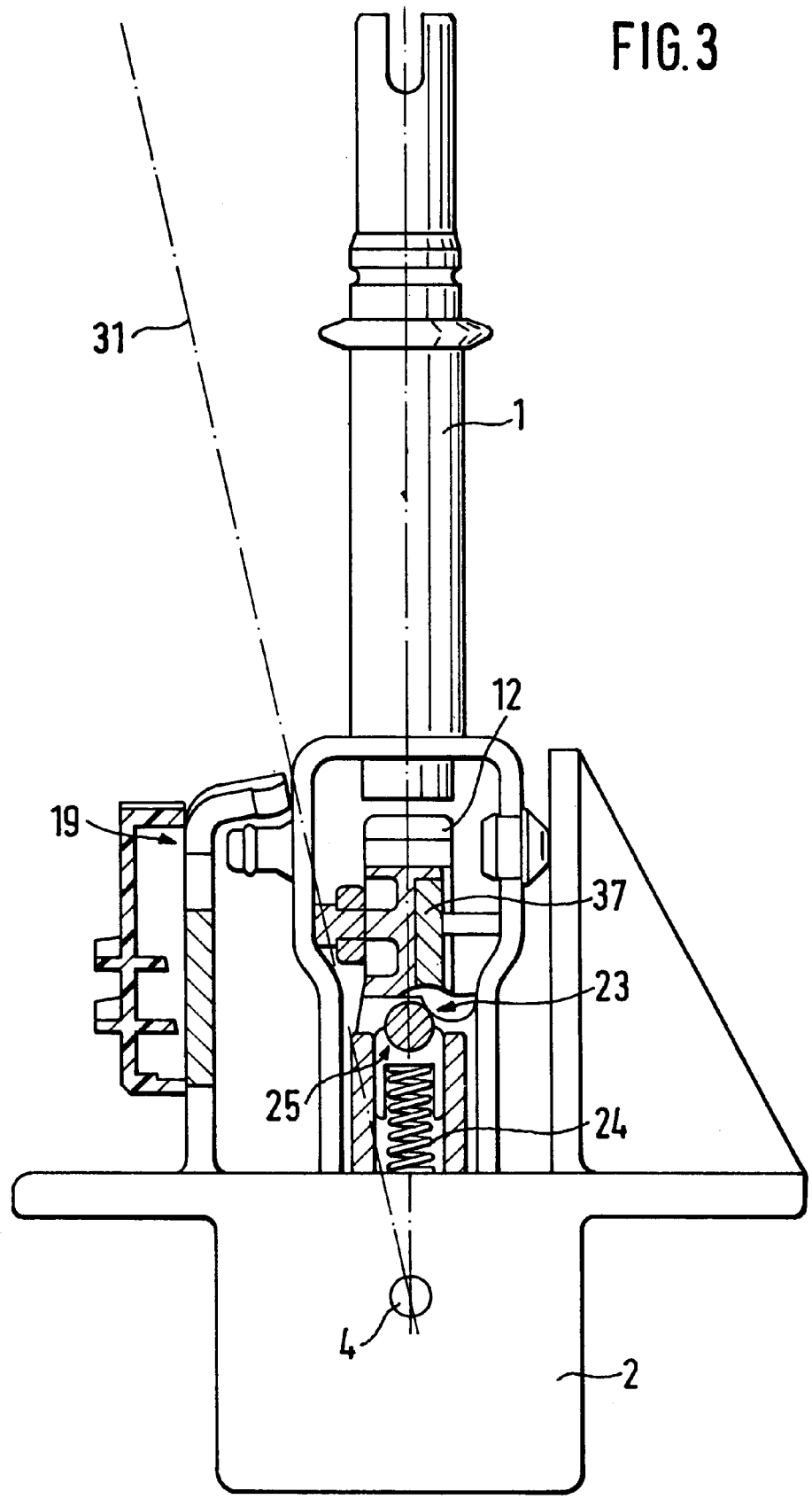
FIG. 3 is a partial sectional view of the detent devices which are constructed on the shifting gate and the frame for fixing the shifting channels of the selecting device of FIGS. 1 and 2.

FIG. 3 shows that the shifting gate 12 has detent devices which, in a spring-loaded manner, engage with corresponding detent devices on the frame 2 and determine the position of the selector lever 1 for each shifting channel in the transverse direction of the vehicle. The detent devices on the shifting gate 12 are recesses 23 into which an element 24, which is loaded by a spring 24 and is movably disposed on the frame 2, engages with its cylindrical surface as a corresponding detent device.

Figure 4:
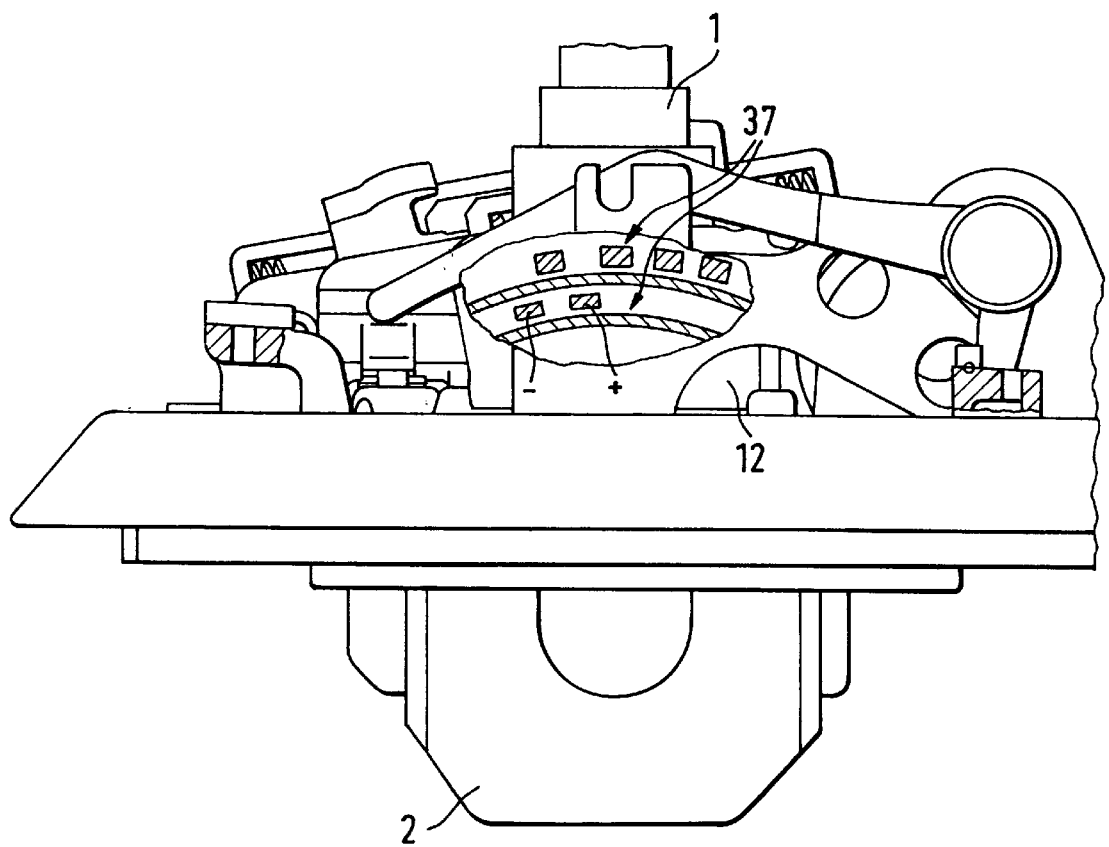
FIG. 4 is a lateral view of the selecting device of FIGS. 1–3 with a partial sectional view in the area of the selecting lever.

Electrical contacts 37 of at least one sensor device on the shifting gate 12 permit the determination of the position of the selector lever 1 in the driving position selection channel as well as in the step shifting channel. When the selector lever 1 is situated in the step shifting channel, the electrical contacts are analyzed which in FIG. 4 are marked by a + and a − sign. The sensor device may optionally be an analog or a digital sensor. Furthermore, a no-contact or contact-having path and or angle measurement is suitable.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Selecting device for an automatic transmission of a motor vehicle, having a selector lever, a first shifting channel for preselecting the individual driving positions in an automatic operation via a mechanical tension/pressure coupling member extending between the automatic transmission and the selector lever, a first end of the mechanical tension/pressure coupling member being connected with the automatic transmission, a second shifting channel for step-by-step shifting of the gears in a manual operation, wherein the selector lever is pivotably supported in a longitudinal and transverse direction of the vehicle by way of a first and a second axle disposed in a vehicle-fixed frame and which, by pivoting about the first axle, can be moved in the longitudinal direction of the vehicle in one of the shifting channels respectively and, by pivoting about the second axle, can be shifted back and forth between the shifting channels in the transverse direction of the vehicle, wherein, in the automatic operation, a pressure connection is formed by the selector lever directly engaging a second end of the mechanical tension/pressure coupling member to transmit longitudinal movements of the selector lever through the tension/pressure coupling member to operate the automatic transmission; and wherein the mechanical tension/pressure coupling member is uncoupled from the selector lever during the step-by-step shifting of the gears in the manual operation.

2. Selecting device according to claim 1, wherein the selector lever is disposed by way of the first axle on a shifting gate which is mounted on the frame by way of the second axle.

3. Selecting device according to claim 2, wherein the shifting gate extends from a bearing point in the frame upwards and a lower section of the selector lever extends in a U-shape to a bearing axis around the shifting gate, the shifting gate having detent noses on its upper surface.

4. Selecting device according to claim 3, wherein the shifting gate has a groove-shaped recess and fifth effective surfaces which, when the selector lever is pivoted about the first axle in the first shifting channel, is positioned in a sliding manner against seventh effective surfaces on the pressure connection, so that a movement of the pressure connection in the transverse direction of the vehicle is prevented.

5. Selecting device according to claim 4, wherein the seventh effective surfaces on the pressure connection are on a holding extension at an end of the pressure connection.

6. Selecting device according to claim 2, wherein the shifting gate has a groove-shaped recess and fifth effective surfaces which, when the selector lever is pivoted about the first axle in the first shifting channel, is positioned in a sliding manner against seventh effective surfaces on the pressure connection so that a movement of the pressure connection in the transverse direction of the vehicle is prevented.

7. Selecting device according to claim 6, wherein the seventh effective surfaces on the pressure connection are on a holding extension at an end of the pressure connection.

8. Selecting device according to claim 2, the shifting gate has sixth effective surfaces which, when the selector lever is pivoted about the second axle into the step-by-step shifting channel, together with third effective surfaces on a holding extension at an end of the pressure connection, enter a third form-locking connection which fixes the pressure connection in the longitudinal direction of the vehicle while first effective surfaces, when the selector lever is set in the shifting channel for the step-by-step shifting, form a first form-locking connection with a step shifting device.

9. Selecting device according to claim 2, wherein the shifting gate has detent devices which, together with a corresponding detent device on the frame, determine a position of the selector lever for each shifting channel in the transverse direction of the vehicle.

10. Selecting device according to claim 9, wherein the detent devices on the shifting gate are recesses and the corresponding detent device on the frame is formed by an element which is disposed thereon while being loaded by a spring and has a rounded surface.

11. Selecting device according to claim 2, wherein at least one sensor device is mounted on the shifting gate and determines the positions of the selector lever in the longitudinal direction of the vehicle in the first shifting channel and the second shifting channel.

12. Selecting device according to claim 1, wherein the selector lever is disposed by way of the first axle on a shifting gate which is mounted on the frame by way of the second axle.

13. Selecting device according to claim 12, wherein the selector lever has first and second effective surfaces, the first effective surfaces engaging by means of its pivoting about the second axle into the shifting channel for the step-by-step shifting in corresponding effective surfaces of the step shifting device thereby forming a first form-locking connection, and the second effective surfaces engaging by its pivoting about the second axle into the shifting channel for the preselection of the individual driving positions in the automatic operation in corresponding third effective surfaces of the pressure connection thereby forming a second form-locking connection.

14. Selecting device according to claim 13, wherein the shifting gate has a groove-shaped recess and fifth effective surfaces which, when the selector lever is pivoted about the first axle in the first shifting channel, is positioned in a sliding manner against seventh effective surfaces on the pressure connection so that a movement of the pressure connection in the transverse direction of the vehicle is prevented and therefore the second form-locking connection is maintained.

15. Selecting device according to claim 14, wherein at least one frame-fixed stop face is provided which limits the longitudinal movement of the selector lever in the shifting channel for the step-by-step shifting.

16. Selecting device according to claim 14, wherein the seventh effective surfaces on the pressure connection are on a holding extension at an end of the pressure connection.

17. Selecting device according to claim 13, the shifting gate has sixth effective surfaces which, when the selector lever is swivelled about the second axle into the step shifting channel, together with the third effective surfaces on a holding extension at an end of the pressure connection, enter a third form-locking connection which fixes the pressure connection in the longitudinal direction of the vehicle while the first effective surfaces, when the selector lever is set in the shifting channel for the step-by-step shifting, form the first form-locking connection with a step shifting device.

18. Selecting device according to claim 1, wherein the selector lever has first and second effective surfaces, the first effective surfaces engaging by means of its pivoting about the second axle into the shifting channel for the step-by-step shifting in corresponding effective surfaces of a step shifting device thereby forming a first form-locking connection, and the second effective surfaces engaging by its pivoting about the second axle into the shifting channel for the preselection of the individual driving positions in the automatic operation in corresponding third effective surfaces of the connection arrangement thereby forming a second form-locking connection.

19. Selecting device according to claim 18, wherein the shifting gate upwardly extends from a bearing point in the frame and a lower section of the selector lever extends in a U-shape to a bearing axis around the shifting gate, the shifting gate having detent noses on an upper surface thereof.

20. Selecting device according to claim 19, wherein a fork is constructed on the frame and will receive an extension of the pressure connection when the selector lever is in a position in which the back and forth shifting between the shifting channels is possible.

21. Selecting device according to claim 1, wherein the frame has a stop face which limits the longitudinal movement of the selector lever in the shifting channel for the preselection of the driving positions at a point at which the back and forth shifting between the shifting channels is possible.

22. Selecting device according to claim 1, wherein a fork is constructed on the frame and will receive an extension of the pressure connection when the selector lever is in a position in which the back and forth shifting between the shifting channels is possible.

23. Selecting device according to claim 1, wherein at least one frame-fixed stop face is provided which limits the longitudinal movement of the selector lever in the shifting channel for the step-by-step shifting.

24. Selecting device according to claim 23, wherein two frame-fixed stop faces are provided, the first frame-fixed stop face limiting longitudinal forward movement of the selector lever as an end stop on one side of the selector lever comes in contact with the first stop face, the second frame fixed stop face limiting longitudinal rearward movement of the selector lever as a stop face on another side of the selector lever comes in contact with the second stop face.

25. Selecting device according to claim 23, wherein the at least one frame-fixed stop face adjoins at least one frame-fixed effective surface which prevents a transverse movement of the selector lever when the selector lever is not in a position in which it is possible to pivot back and forth between the shifting channels.

26. Selecting device according to claim 25, wherein at least one of the frame-fixed stop faces or at least one of the frame-fixed effective surfaces is constructed directly on the frame.

27. Selecting device according to claim 23, wherein at least one of the frame-fixed stop faces is constructed directly on the frame.

28. Selecting device according to claim 23, wherein the pressure connection during the step-by-step shifting of the gears in the manual operation is uncoupled from the selector lever.

29. Selecting device according to claim 23, wherein the selector lever is disposed by way of the first axle on a shifting gate which is mounted on the frame by way of the second axle.

* * * * *